(12) United States Patent
Boyer et al.

(10) Patent No.: US 11,161,311 B2
(45) Date of Patent: ***Nov. 2, 2021

(54) COMBINED PRIMARY FIBER AND CARBON FIBER COMPONENT FOR PRODUCTION OF REINFORCED POLYMERIC ARTICLES

(71) Applicant: Continental Structural Plastics, Inc., Auburn Hills, MI (US)

(72) Inventors: Dominique Boyer, Pouance (FR); Gaetan Boivin, Pouance (FR); Probir Kumar Guha, Bloomfield Hills, MI (US); Marc-Philippe Toitgans, Pouance (FR)

(73) Assignee: CONTINENTAL STRUCTURAL PLASTICS, INC., Auburn Hills, MI (US)

( * ) Notice: Subject to any disclaimer, the term of this patent is extended or adjusted under 35 U.S.C. 154(b) by 14 days.

This patent is subject to a terminal disclaimer.

(21) Appl. No.: 16/472,702

(22) PCT Filed: Dec. 18, 2017

(86) PCT No.: PCT/US2017/066939
§ 371 (c)(1),
(2) Date: Jun. 21, 2019

(87) PCT Pub. No.: WO2018/125626
PCT Pub. Date: Jul. 5, 2018

(65) Prior Publication Data
US 2019/0358914 A1    Nov. 28, 2019

Related U.S. Application Data

(60) Provisional application No. 62/439,090, filed on Dec. 26, 2016.

(51) Int. Cl.
*B32B 5/08*    (2006.01)
*B32B 7/12*    (2006.01)
(Continued)

(52) U.S. Cl.
CPC ............ *B29C 70/081* (2013.01); *B29C 70/48* (2013.01); *B29C 70/78* (2013.01); *B32B 5/08* (2013.01);
(Continued)

(58) Field of Classification Search
CPC .. B32B 5/08; B32B 7/022; B32B 7/12; B32B 27/08; B32B 2250/02; B32B 2250/24;
(Continued)

(56) References Cited

U.S. PATENT DOCUMENTS 5,753,164 A    5/1998  Ritchie et al.
2008/0096032 A1    4/2008  Guha et al.
(Continued)

FOREIGN PATENT DOCUMENTS

JP    2001064406 A    3/2001
JP    2003080607 A    3/2003
(Continued)

OTHER PUBLICATIONS

Int'l. Search Report for PCT/US2017/066939, dated Apr. 17, 2018.
(Continued)

*Primary Examiner* — Catherine A. Simone
(74) *Attorney, Agent, or Firm* — Blue Filament Law PLLC

(57) ABSTRACT

A dual layer cured composite article is provided that has an outer part having an outer part thickness composed of a first resin matrix having between 50 and 70 total weight percent of the outer part being an outer part mixed fiber filler, the outer part mixed fiber filler having an outer part primary fiber:carbon fiber ratio of 0.05-20:1. An inner part comple-
(Continued)

mentary to the outer part is provided and has an inner part thickness composed of a second resin matrix having between 40 and 60 total weight percent of the inner part of an inner mixed fiber filler, the inner mixed fiber filler having an inner part primary fiber:carbon fiber ratio of less than said outer part primary fiber:carbon fiber ratio. A joinder between the outer part and the inner part is provided. A process for producing such an article is also provided.

15 Claims, 3 Drawing Sheets

(51) Int. Cl.
| | |
|---|---|
| *B32B 5/26* | (2006.01) |
| *B29C 70/08* | (2006.01) |
| *B32B 7/022* | (2019.01) |
| *B29C 70/48* | (2006.01) |
| *B29C 70/78* | (2006.01) |
| *B32B 27/08* | (2006.01) |

(52) U.S. Cl.
CPC .............. *B32B 5/26* (2013.01); *B32B 7/022* (2019.01); *B32B 7/12* (2013.01); *B32B 27/08* (2013.01); *B32B 2250/02* (2013.01); *B32B 2250/24* (2013.01); *B32B 2260/021* (2013.01); *B32B 2260/046* (2013.01); *B32B 2262/101* (2013.01); *B32B 2262/106* (2013.01); *B32B 2305/70* (2013.01); *B32B 2307/72* (2013.01); *B32B 2307/732* (2013.01); *B32B 2605/00* (2013.01)

(58) Field of Classification Search
CPC ........ B32B 2260/021; B32B 2260/023; B32B 2260/046; B32B 2262/101; B32B 2262/106; B32B 2305/70; B32B 2307/72; B32B 2307/732; B32B 2605/00; B32B 5/26; B29C 70/081; B29C 70/48; B29C 70/78

See application file for complete search history.

(56) References Cited

U.S. PATENT DOCUMENTS

| | | |
|---|---|---|
| 2011/0027571 A1 | 2/2011 | Wakeman et al. |
| 2015/0352818 A1 | 12/2015 | Glotin et al. |
| 2016/0082650 A1 | 3/2016 | Carson |
| 2016/0152283 A1 | 6/2016 | Guha et al. |
| 2019/0160794 A1* | 5/2019 | Bonte .................. B32B 27/302 |

FOREIGN PATENT DOCUMENTS

| | | |
|---|---|---|
| JP | 2009113369 A | 5/2009 |
| JP | 2013176984 A | 9/2013 |
| WO | 2006091031 A1 | 8/2006 |
| WO | 2014210310 A1 | 12/2014 |
| WO | 2016057733 A1 | 4/2016 |
| WO | 2017180560 A1 | 10/2017 |

OTHER PUBLICATIONS

Supplementary European Search Report issued in EP17887702, dated Jul. 15, 2020.
First Office Action issued in corresponding Japanese Patent Appln. No. 2019-534889, dated Jul. 8, 2021 (with machine translation).

* cited by examiner

COMBINED PRIMARY FIBER AND CARBON FIBER COMPONENT FOR PRODUCTION OF REINFORCED POLYMERIC ARTICLES

RELATED APPLICATIONS

This application claims priority benefit of US Provisional Application Ser. No. 62/439,090 filed 26 Dec. 2016; the contents of which are hereby incorporated by reference.

FIELD OF THE INVENTION

The present invention in general relates to fiber filled articles and, more particularly, to a process for molding with a non-oriented mixtures of carbon fiber and glass fiber tow, mixed fiber woven rovings or mixed fiber unwoven mats.

BACKGROUND OF THE INVENTION

There is a continuing drive to improve vehicle performance and efficiency. In the continuum of processes to lighten vehicle body panels, steel thickness was reduced and then supplanted with lower density materials such as aluminum and resin based materials. Evidence is developing that aluminum has several limitations that favor resin based vehicle body articles. It now appears that the material costs, forming costs and the tensile strength of aluminum at the thicknesses needed to achieve ever lighter body panels create a collective limitation. In contrast, resin based articles can be tailored by changes in resin chemistry and additives to meet a range of requirements. Additionally, while metal forming of complex shapes requires several steps, a well-designed mold can impart complex shapes in a single step.

While glass fibers have been used for decades to reinforce resin articles such as sheet molding compositions (SMCs), the comparatively high density of glass and the limitations in tensile modulus obtainable appear to make glass filled resins alone incapable meeting the requirements for ever-lighter, yet strong vehicle panel articles. While carbon fiber filled resins are able to achieve reductions in density and higher tensile modulus relative to glass-filled like resins, the resulting articles have higher material costs and lack the surface gloss of like articles formed with glass fiber filler.

Attempts have been made to create articles with mixed fibers of both glass and carbon. These efforts demonstrate at a laboratory scale that such articles have several attractive properties compared to single fiber reinforced resins, especially when a dual layer article is produced. WO2014/210310 is exemplary of these efforts.

A difficulty encountered in producing mixed fiber resin matrix articles is the formation of a uniform layer of randomly oriented and intermixed glass fibers and carbon fibers. Similarly, the limited access to mixed fiber rovings and non-wovens has hampered efforts to reduce weight of vehicle body panels. Fibers for fiber reinforced resin molding are typically produced by chopping a tow formed bundles of long fiber lengths into preselected lengths. While glass fibers are usually produced in tows of a few hundred fibers and cut cleanly to produce individual fibers, carbon fibers have diameters of about 5 to 10 micrometers, much smaller than glass fibers with diameters of 10 to 25 micrometers, and are manufactured in tows containing tens of thousands of fibers. Owing to physical and chemical differences carbon fibers tend to form clumps of fibers rather than randomly oriented, individual fibers commonly observed with glass fibers.

Thus, there exists a need for a way to provide controlled dispersion of mixed primary fibers and carbon fibers for use in resin molding, regardless of whether such fibers are randomly oriented short lengths, woven fiber rovings, or non-woven fiber mats. There further exists a need for an article produced from such mixed fibers. Still further, there exists a need to mass produce such articles through methods of RTM, wet molding, compression molding, and injection molding.

SUMMARY OF THE INVENTION

A dual layer cured composite article is provided that has an outer part having an outer part thickness composed of a first resin matrix having between 50 and 70 total weight percent of the outer part being an outer part mixed fiber filler, the outer part mixed fiber filler having an outer part primary fiber:carbon fiber ratio of 0.05-20:1. An inner part complementary to the outer part is provided and has an inner part thickness composed of a second resin matrix having between 40 and 60 total weight percent of the inner part of an inner mixed fiber filler, the inner mixed fiber filler having an inner part primary fiber:carbon fiber ratio of less than said outer part primary fiber:carbon fiber ratio. A joinder between the outer part and the inner part is provided.

A process for producing such an article is also provided.

BRIEF DESCRIPTION OF THE DRAWINGS

The present invention is further detailed with respect to the following drawings. These drawings are not intended to limit the scope of the appended claims, but rather to illustrate specific embodiments thereof.

DETAILED DESCRIPTION OF THE INVENTION

Figure 1:
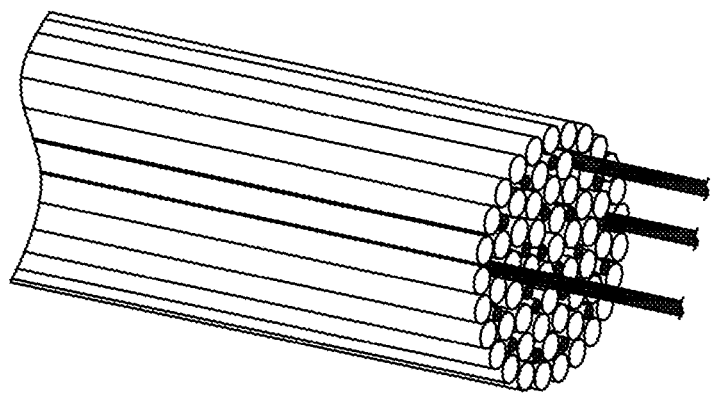
FIG. 1 is a perspective view of a mixed fiber bundle tow that upon being chopped provides randomly oriented primary and carbon fibers for the process of article formation according to the present invention.

The present invention has utility as a process for molding a resin matrix around a distribution of well distributed primary fibers and carbon fibers. In particular, an article is mass produced by a molding process based on a multiple layer structure, with an outer panel having a high degree of surface smoothness common to automotive body panels and a comparatively high tensile strength joinder thereto. The mixed fibers are present in a single panel of an article or all such panels of a multiple layer article. It is appreciated that the mixed fibers can be present in articles in a form of: chopped fibers that are intermixed and vary in orientation, a woven roving containing predominately glass fibers with carbon fibers dispersed there through, or non-woven fiber mats.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, "compression molding" is defined to include stamping, pultrusion and overmolding processes.

Stamping is a process in which a stack of organosheets, tapes, or a combination thereof are heated then pressed with a die and cooled. An organosheet or the tape is readily made with a mixed fibers, with a tape typically continuous in unidirection, while an organosheet is typically continuous in a woven mesh.

Pultrusion is a process for producing mainly continuous lengths of reinforced polymer structural shapes with constant cross-sections. Raw materials are a liquid resin mixture containing resin, fillers, specialized additives, and fabrics or veils/mats or tow/roving as reinforcing fibers. Pultrusion is often used to form vehicle articles such as profiles and beams.

Overmolding involves forming by stamping of a sheet of fibers (glass or carbon or a mixed of fibers) impregnated with a thermoplastics matrix to from an insert/preform that is placed in a mold cavity with a thermoplastics polymers often filled fiber fillers enrobing the insert. It is appreciated that a preform of a mix of glass/carbon fibers and thermoplastics fibers is also suitable in this process.

Resin transfer molding (RTM) is a process by which a preform is made with mixed filler fibers and a small percentage of thermoplastics fibers of approximately 1 to 10 total weight percent. The thermoplastic fiber acting as a binder. An epoxy powder may also be used as a binder.

As used herein, "entangled fibers" are defined as fibers in which a given fiber has at least two contact points on average with at least one additional fiber.

A fiber suitable for intermixing with carbon fiber to form an inventive article illustratively includes glass; thermoplastics of polyethylene, polypropylene, polyamides, polyimides, polyether ether ketone (PEEK), polycarbonates, polyethylene terephthalate (PET), copolymers of any of the aforementioned, and mixtures of any of the aforementioned individual polymers or copolymers; natural fibers of cotton, wool, hemp, cane, bamboo, jute, straw, silk, straw, palm frond, coconut husk, coconut fiber; and combinations thereof; or a combination thereof. Typical lengths of filler fibers when used in chopped forms used in the present invention typically range from 0.5 to 6 centimeters (cm). The diameters of filler fibers are appreciated to vary widely based on commercial sources with glass filler fibers having typical diameters of 0.03 to 0.5 millimeters (mm); carbon filler fibers having typical diameters of 0.005 to 0.1 mm; and natural filler fibers having typical diameters of 0.01 to 0.3 mm. It should be appreciated that fiber dimensions outside of the aforementioned typical ranges exist and are intended to be within the scope of the present invention.

As used herein, a fiber suitable for intermixing with carbon fiber is termed a primary fiber. It is to be understood that a primary fiber does not imply the majority of total fiber weight is primary fiber unless so stated.

A mixed fiber tow is formed in a variety of ways including by interspersing single or bundles of carbon fibers into a tow of primary fibers either through spreading of each tow after separate formation or through simultaneous joinder to form an initial mixed fiber tow. The weight ratio of primary fibers to carbon fibers in a mixed fiber tow ranges from 0.05-20:1 of primary fiber:carbon fiber. A perspective view of such a tow prior to chopping is shown in FIG. 1 in which filled fibers denote carbon fibers and unfilled fibers are primary fibers.

Figure 2:
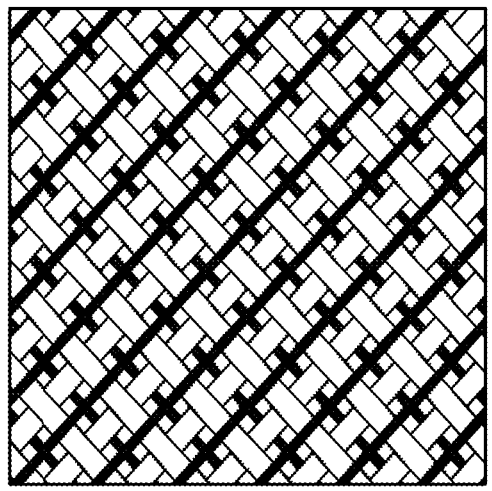
FIG. 2 is a top down perspective view of mixed fiber woven roving that is operative in the present invention as either a sheet or source of chopped randomly oriented primary and carbon fibers for the process of article formation according to the present invention.

A mixed fiber woven roving has at least one spool of carbon fiber interwoven with the roving formation from primary fiber or by subsequently stitching carbon fiber single threads or multiple fiber carbon fiber bundles into such a roving. The weight ratio of primary fibers to carbon fibers in a mixed fiber woven rovings ranges from 0.05-20:1 of primary fiber:carbon fiber. A perspective view of such a woven is shown in FIG. 2 in which filled fibers denote carbon fibers and unfilled fibers are primary fibers. The carbon fiber used in the present invention being virgin or recycled carbon fiber.

A mixed fiber non-woven mat is formed by conventional spunlace techniques in which are needlepunching and spunlacing (hydroentanglement) intertwines thermoplastic and carbon fibers. Spunlacing uses high-speed jets of water to strike a web so that the fibers knot about one another. In an alternate embodiment, spunbonding of a thermoplastic fiber equipped with a deflector and entraining carbon fiber into the spunbond allows a nonwoven mat to be formed containing a preselected amount of carbon fiber. The weight ratio of primary thermoplastic fibers to carbon fibers in a mixed fiber woven rovings ranges 1-50:1 of primary thermoplastic fiber: carbon fiber. A perspective view of such a mat with random fiber orientations is shown in FIG. 3A in which filled fibers denote carbon fibers and unfilled fibers are primary fibers. FIG. 3B is a perspective view of a mat with oriented carbon fibers.

The mixed fibers produced according to the present invention are well suited for forming articles through a process of sheet molding, overmolding, resin transfer molding (RTM), or wet molding.

A variety of base resin formulations benefit from incorporation of the inventive mixed fibers as chopped tow, or shredded rovings, or mats. Base formulations suitable to incorporate mixed fibers with the base SMC include those described in U.S. Pat. Nos. 4,260,538; 4,643,126; 5,100, 935; 5,268,400; 5,854,317 and 6,780,923.

A principal component of a base resin formulation is a cross-linkable polymer resin such as an unsaturated polyester resin or vinyl ester resin. The prepolymer polymeric resin has a molecular weight on average of typically between 200 and 50,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites.

Vinyl ester resins are also typically employed in base resin formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. Representative monomers illustratively are styrene, vinyl toluene, divinyl benzene, acrylic acid esters and methacrylic acid esters, such as methylacrylate, ethylacrylate, n-butylacrylate, 2-ethylhexylacrylate, methylmethacrylate, pentaerythritol thiacrylate, ethyleneglycol dimethacrylate, diallyl maleate, diallyl fumarate, triallycyanurate, vinyl acetate, vinyl propionate, vinyl ether, acrylonitrile, and the like. It is appreciated that more than one type of monomer can be used in a molding composition. The monomer provides benefits including lower prepolymer viscosity and thermosetting without formation of a volatile byproduct.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy)3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0 to 3 total weight percent.

In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 2 total weight percent.

Chopped mixed fibers are added to the uncured base resin formulation mixture in amounts of from 5 to 40 total weight percent. In still other embodiments, the mixed fibers are present from 7 to 35 total weight percent. Other conventional additives illustratively include low profile additives, colorants, particle fillers such as hollow microspheres from 10 to 70 microns or inorganic carbonates, and antioxidants are also readily added. Hollow microspheres are readily derivatized to covalently bond to a resin matrix and thereby increase the pull strength of the resulting cured article. The use of such microspheres is detailed in US 2006/0258781; and U.S. provisional application 62/018,377. It is appreciated that the resulting cured article is rendered electrically conductive while still having a high quality surface finish through the addition of particulate as detailed in U.S. Pat. No. 7,655,297 B2.

In overmolding, an insert or substrate with non-oriented thermoplastic fibers present in an amount that allows them to thermally bond in the presence of non-oriented filler of mixed primary and carbon fibers. The primary fibers being the same as the thermoplastic fibers or different therefrom. The thermoplastic fiber fusion retains the mixed filler fibers within the insert upon cooling. The filler fibers are selected to modify the properties of the insert and an overmolded article formed with the insert therein. A mixed fiber of glass and carbon fibers is particularly well suited for producing high tensile modulus vehicle body panels.

Melt processable materials typically used in overmolding include elastomers and thermoplastics. The resulting dry preform of fused elastomeric or thermoplastic retained a shape with embedded mixed fibers as randomly oriented fibers, woven roving, or unwoven mat is suitable for overmolding by processes such as RTM and wet molding.

The preform so produced is amenable to placement onto a mold platen for injection of resin through a process of RTM or wet molding. It is appreciated that the resin so applied to coat the preform is either inclusive of glass fibers, carbon fibers or the mixed fibers of the present invention; or is devoid of additional fiber content. It is appreciated that the flow of resin entraining fibers leads to partially oriented and inhomogeneous fiber fill in the resulting article, especially in article regions of atypical flow such as around edges and curves. Wet molding or applying resin devoid of fiber fillers to a preform appear to inhibit partially oriented and inhomogeneous fiber fill in the resulting article. Limiting differences in localized fiber concentration and inhomogeneity of fiber orientation are manifest in a lower required safety margin in design of the article. As a result, wet molding is a process chosen in certain inventive embodiments to form high tensile strength articles with minimal thickness and therefore weight.

Articles produced according the present invention are used in a variety of applications illustratively including vehicle components such as automotive vehicle deck lid, a vehicle door, a vehicle roof, a vehicle fender, a vehicle floor, bumpers, floor, a vehicle body in white component (A or B pillar). Articles formed with the inventive process yield weight reductions compared to conventional aluminum and SMC moldings, while delivering superior tensile strength. High tensile strength is best imparted by resort to a dual or more layer article in which a comparatively higher density outer layer is produced that contains a higher ratio of primary fiber to carbon fiber with an emphasis on cosmetic appearance relative to an inner layer having a higher proportion of carbon fiber to primary fiber to impart tensile strength to the article upon contact joinder between the layers. It is appreciated still further control can be exerted over article properties by adjusting the relative thickness of an outer layer to an inner layer of an article. A joinder for a dual or multilayer article includes both mechanical fasteners and an intermediate adhesive layer. Suitable adhesives illustrative include urethanes, epoxides. A particular preferred resin is epoxide for RTM and polyamide for stamping, pultrusion or overmolding. It has been surprisingly discovered that a superior article is formed from a mixed fiber tow, or mixed fiber fabric. Without intending to be bound by a particular theory, it is believed that a mixed fiber source provides a more homogenous distribution of fibers than obtained from mono-type fiber sources that are mixed during the chopping process. The more homogenous distribution of fibers is associated with superior article properties compared to conventionally mixing of chopped mono-type source fibers.

In one embodiment of the present invention, an outer layer, synonymously referred to an outer part, of an article is formed that has a primary fiber:carbon fiber ratio of between 0.05-20:1 with a total fiber loading of primary and carbon fiber in the outer layer of between 50 and 70 total weight percent. The primary fiber in specific inventive embodiments of the outer layer is glass fiber. An outer layer has a specific gravity of between 0.9 and 1.3. A joined inner layer in contrast to the outer layer has a primary fiber:carbon fiber ratio that is less than that in the outer part. The primary fiber in specific inventive embodiments of the inner layer is glass fiber. An outer layer has a specific gravity of between 0.9 and 1.6. The ratio of outer layer to inner layer thickness being between 1-2:1. By way of example, an outer layer has a typical thickness of 0.9 to 3.5 mm; and an inner layer has a typical thickness of 0.9 to 2.4 mm. In specific embodiments, the outer layer has a higher ratio of primary fiber: carbon fiber and a greater thickness than a joined inner layer. In still other embodiments, the outer layer has a surface capable of finishing to a conventional new automobile surface gloss, as measured by ASTM D523.

Mixed filler fibers are applied directly onto a mold platen, formed as a preform alone, premixed with uncured resin, or premixed with thermoplastic fibers. Such mixed chopped fibers either applied to a mold surface as a dry mass or as a slurry. It is appreciated that thermoplastic fibers and various filler fibers are applied sequentially to a mold surface or premixed to form a fiber mixture. A slurry, if present is formed that includes a source of fibers of a given diameter that have been cut to a predetermined length or a variety of lengths; the fibers being in a solvent along with additives. The additives including a dispersing agent, particulate fillers to promote drying, binders, or a combination thereof. An inventive slurry applied using a conventional preform system or used with an inventive centrifugal preform system.

A solvent for an inventive slurry is largely dictated only by handling properties and compatibility with mold form materials, fibers, and slurry additives. Solvents operative herein illustratively include water, $C_1$-$C_{12}$ alcohols, toluene, ($C_1$-$C_6$ alkyl)-$C_1$-$C_6$ esters, ($C_1$-$C_6$)$_2$C=O ketones, and miscible combinations thereof. In order to comply with limits on volatile organic content (VOC) and waste treatment, in certain inventive embodiments, the slurry is aqueous. As will be detailed hereafter, a self-contained slurry is also provided with solvent recycle thereby obviating concerns about solvent VOC content and handling.

In certain embodiments of the present invention, thermoplastic fibers are overmolded to make up at least 25 total weight percent of the fiber content by a weight percentage of fibers. It is appreciated that continuous, direction use of such thermoplastic fibers are also operative in the current invention. Typical lengths of the thermoplastic fibers are between 0.5 and 10 cm. Typical diameters of the thermoplastic fibers are between 0.01 and 0.7 mm. In some embodiments thermoplastic fillers with an aspect ratio between longest dimension and shortest dimension of the thermoplastic filler of less than 10:1 is also used herein in combination with the thermoplastic fillers. It should be appreciated that the thermoplastic fibers must form a fusion bond with at least 1.3 other individual thermoplastic fibers based on a statistical average. In still other embodiments each thermoplastic fiber forms between 1.5 and 8.4 bonds to other thermoplastic fibers. It should be appreciated that small diameter and long length thermoplastic fibers have increased fusions bonds relative to thicker and shorter fibers for a given weight percentage of thermoplastic fibers.

The present invention affords particular advantages in terms of recycled content, strength, density, or a combination of such properties through the inclusion of mixed fiber fillers. In certain embodiments, carbon filler fiber represents 5 to 60 total fiber weight percent of the preform. In certain embodiments, glass filler fiber represents 20 to 60 total fiber weight percent of the preform. In certain embodiments cellulosic filler fiber represents 0 to 10 total fiber weight percent of the preform.

In certain inventive embodiments, the mixed filler fibers have a median length that is between 80 and 1000% of the average length of the thermoplastic fibers. In general, a fiber filler should have an intersection with a statistical average of at least 2.2 thermoplastic fibers in an insert produced according to the present invention. In other embodiments of the present invention, an inventive insert has a mean filler fiber length that is proportional to the reciprocal square root of the number of fusion bonds between thermoplastic fibers. Without intending to be bound by a particular theory, when the number of thermoplastic fiber bonds is comparatively low, longer fill fibers interweave between fusion points and create added mechanical stability to the fusion bonded and cooled insert produced according to the present invention.

In still other embodiments of the present invention, thermoplastic fibers constitute 30-85 total fiber weight percent with mixed fiber fillers being present along with cellulosic fiber fillers also being present. In another particular embodiment, the glass and or carbon fiber fillers are present at a higher weight percentage than the cellulosic fibers.

The use of hydrophobic fibers in a water based slurry is promoted in the present invention by inclusion of a dispersing agent that serves to debundle and otherwise create randomized and individual dispersed fibers from chopped mixed fiber fill. The dispersing agent includes small molecules or monomers with a molecular weight of less than 500 atomic mass units and having the general formula $(R^1)_2$—C=N—$R^2$ or $R^3$-pyrrolidines, where $R^1$ in each instance is independently H, $C_1$-$C_6$ alkyl, $C_1$-$C_6$ alkenyl, and $C_1$-$C_6$ alkyl having a substituent, the substituent being H, OH, COOH, $NH_2$, NH $C_1$-$C_6$ alkyl or W in both instances are contented to form a 5 or 6 member ring structure; $R^2$ is $C_1$-$C_6$ alkyl, OH, and $C_1$-$C_6$ alkyl having a substituent, the substituent being H, OH, COOH, $NH_2$, NH $C_1$-$C_6$ alkyl; or $R^1$ and $R^2$ combine to form a 5 or 6 member ring structure and $R^3$ is H, $C_1$-$C_6$ alkyl, $C_1$-$C_6$ carboxyl, $C_1$-$C_6$ hydroxyl, or ($C_1$-$C_6$)—$NH_2$. Exemplary molecular dispersing agent include imidazoline, guanidine, oximes, and proline. Exemplary polymeric dispersing agents include polymeric imidazolines such as those detailed in U.S. Pat. No. 3,288,707 including those based on a 2-vinyl imidazoline. A dispersing agent in typically present in a fully formulated slurry from 0.01 to 1 total weight percent.

A dispersing agent for fibers includes a conventional surfactant, or a colloidal particulate filler. Such particulate fillers illustratively include colloidal silica, calcium carbonate, mica, clays, and combinations thereof. Colloidal fillers typically have a diameter of between 2 and 20 times the diameter of the thermoplastic fibers present in the slurry. Without intending to be bound to a particular theory, colloidal filler with this size differential relative to fibers promotes retention of particles in the fiber mass.

To facilitate a rapid build in viscosity as the solvent is removed from an inventive slurry, a polymeric binder is provided in certain embodiments. The binder limits the ability of fibers to migrate under the forces of drying as water or other solvent is removed from slurry on a mold surface. Binders operative herein in aqueous based slurries illustratively include lignosulfonates; proteins such as albumin; polyethylene glycols and especially those with molecular weights of between 600 and 1000; polyvinyl alcohols, pectins, and alkylated celluloses, and combinations thereof. Binders for hydrophobic slurries illustratively include polyvinylpyrrolidones, polystyrenes, cellulosic fillers, and combinations thereof. A binder is typically present in an amount of up to 1 total weight percent of a slurry.

The slurry in some embodiments also includes additional additives to facilitate slurry handling and storage. Such additional additives include chelating agents, antimicrobials, antifoaming agents, antistatic agents, and combinations thereof. Such additional additives, if present, are typically individually present in a slurry from 0.00001 to 0.1 total weight percent of the fully formulated slurry.

Wet molding with inventive mixed fibers to achieve a high tensile strength article of minimal thickness, and if desired, automotive body panel surface quality finish. A satisfactory surface quality is defined by ASTM D523.

Figure 4A:
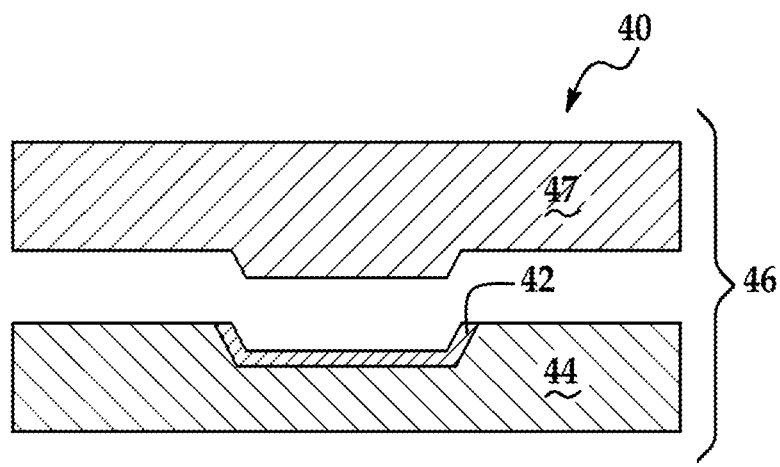
FIGS. 4A-4F are sequential schematic views of a wet molding process using a preform of the present invention.

A process of wet molding according to the present invention is detailed generally at 40 with respect to FIGS. 4A-4F. This schematic depicts a composite of several different individual processes that vary in the form and location of the mixed fiber sources. In FIG. 4A, mixed fiber preform 42 is positioned into contact with a first platen 44 of a mold 46. The mold 46 is depicted as a two-part mold with a complementary, second platen 47 that define a mold cavity with dimensions associated with the molded and cure article or a layer of the article. It is appreciated that a mold used in the present invention can include more than two platens or have a single platen with material urged into conformance with the platen surface with pneumatic pressure. The preform 42 is readily formed by overmolding with a thermoplastic fiber as detailed above, or a preform pre-impregnated with uncured resin.

Figure 3:
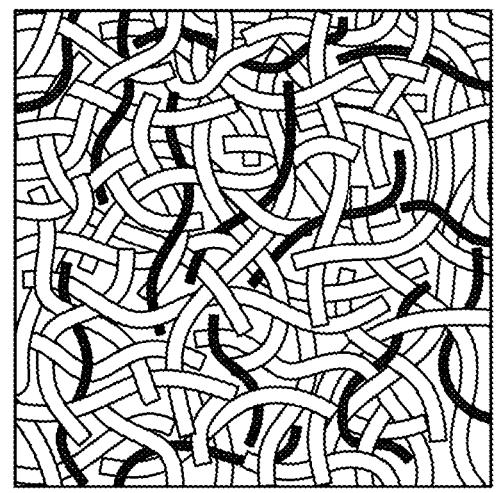
FIG. 3 is a top down perspective view of mixed fiber non-woven mat that is operative in the present invention as either a sheet or source of chopped randomly oriented primary and carbon fibers for the process of article formation according to the present invention.
Figure 4B:
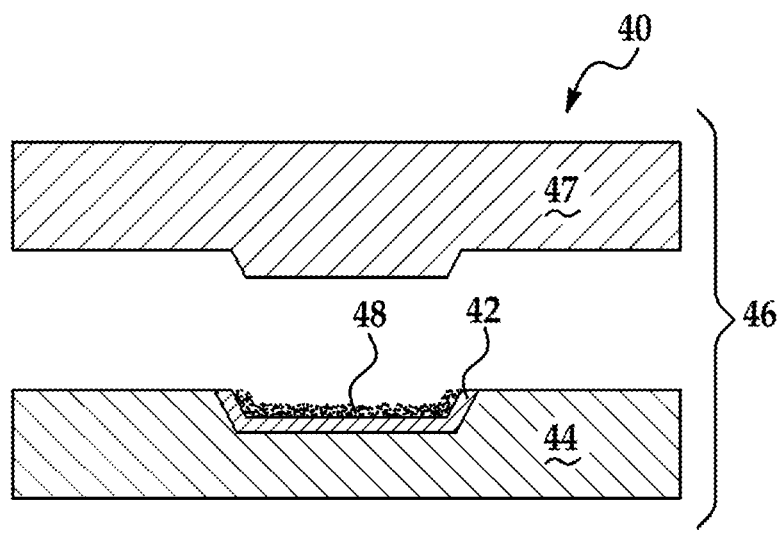

In FIG. 4B, layer of chopped mixed fiber 48 is applied in place of, or in addition to the preform 42. In FIG. 4B, the preform 42 is depicted as present and the layer 48 applied thereof. It is appreciated that the layer of chopped mixed fiber 48 is readily applied directly onto the platen 44. The layer of chopped mixed fiber 48 is produced from a mixed fiber tow, woven fabric, or non-woven, as depicted in FIGS. 1-3, respectively. The layer of chopped mixed fiber 48 has a greater degree of homogeneity than applying such fibers from separate source of each fiber.

Figure 4C:
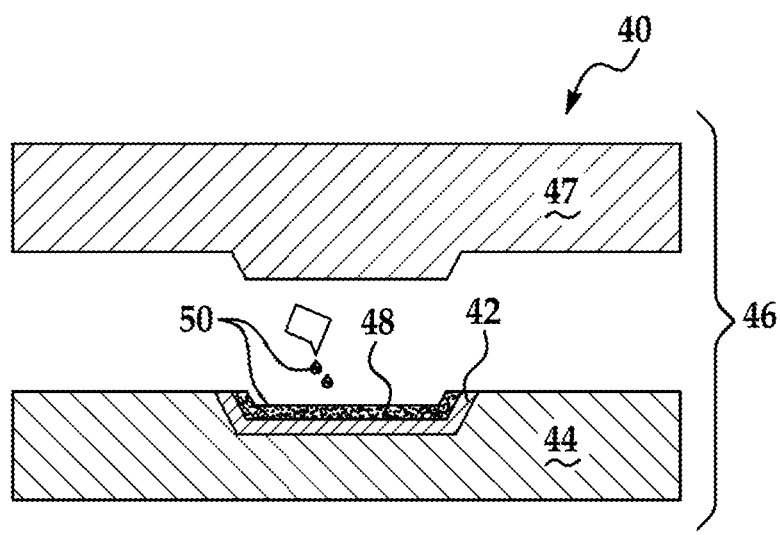

In FIG. 4C, an optional woven or non-woven sheet 50 is placed into the open mold cavity defined by platen 44 and over the preform 42, the layer of chopped mixed fiber 48, or the combination thereof. The sheet 50 is contemplated to be added to articles in which a high degree of strength is needed. The fabric 50 illustratively includes a mixed fiber fabric as detailed above, a conventional thermoplastic fabric, a woven metallic, a polyaramid, or a glass fabric.

Figure 4D:
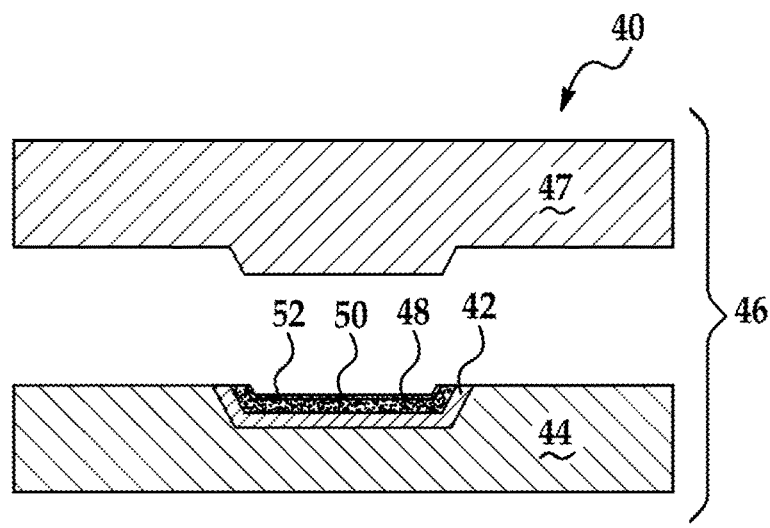

In FIG. 4D, a curable resin 52 is applied as a syrup and is typically poured to a desired thickness over materials in the mold cavity of 42 or 48, each alone, in combination, or still further with sheet 50. The resin 52 is one or more of the curable resins detailed above. By pouring the resin into the mold cavity. The resin 52 in some inventive embodiments is premixed with fillers, the fillers in some instance of the present invention including mixed chopped fibers of the present invention. Regardless of whether the resin 52 is the minimal lateral resin movement occurs upon contact with the mold cavity contents thereby inhibiting the partially oriented and inhomogeneous fiber fill associated with RTM and SMC processes. It is appreciated that the resin 52 degrades in response to contact with the air (and in the absence of a timely and suitable thermoset heating and compression process). It is appreciated that through selection of the resin, resort to a non-reactive gas mixture, rapid mold closure, or a combination of such ameliorative steps that resin degradation prior to cure are largely mitigated.

Figure 4E:
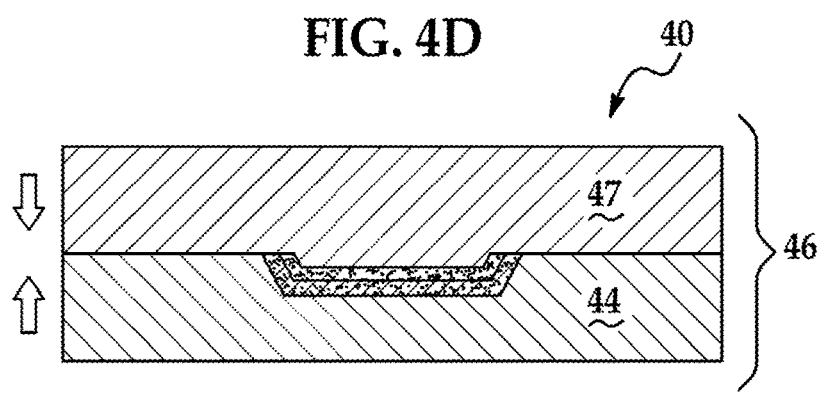
Figure 4F:
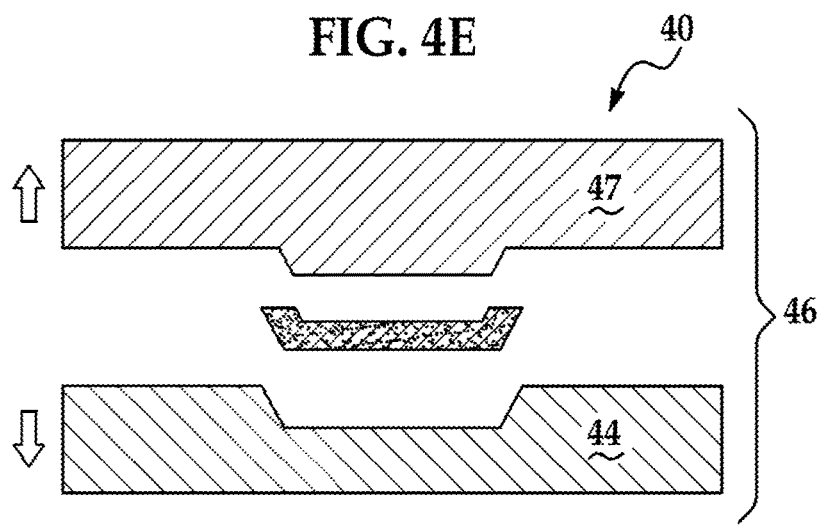

At FIG. 4E, the appropriate heat and compressive forces are applied through the closure of platen 47 toward platen 44 prior to air degradation of the resin 52. As shown in FIG. 4E the platen has an injection port 49 to inject resin with fibers as for example in a bulk molding composition (BMC) process, as well as for thermoplastic materials with short fibers for an injection molding process. In some cases, the injected material may be without fibers. FIG. 4F illustrates a material injected into the injection port 49 and flowing into the cavity formed between the first platen 44 and the second platen 47.

To facilitate throughput in mold 46, conventional molding processes are readily employed that illustratively include: applying a vacuum to the mold cavity to facilitate degassing, application of a mold release to the mold platens, preheating one or more of the mold platens, or a combination thereof. With application of heat and pressure, the resin permeates the stack of materials preloaded into the mold and cures the mixed fibers into a cured resin matrix. In an alternative embodiment, fluid pressure is applied in lieu of platen pressure to achieve molding; with gas pressure being particular advantageous and well suited for open molding.

In FIG. 4F, the molded part 54 is either an article per se or layer of an article is removed from contact with the mold platens 44 and 47. The molded part 54 in some inventive embodiments is subjected to finishing operations such as trimming sanding, planning, powder priming, priming, painting, or a combination thereof.

Figure 5:
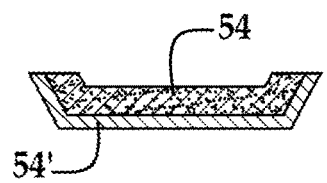
FIG. 5 is a cross-sectional schematic view of a molded part produced per FIGS. 4A-4G, nested with a similar mold to form a dual layer molded inventive article.

In instances where the molded part 54 is a layer of a molded article, the molded part 54 is joined to a similar molded part 54' to produce a dual layer article with the proviso that molded part 54' is sized to accommodate the nest of parts 54 and 54', as shown in FIG. 5. The molded parts 54 and 54' are illustratively joined with mechanical fasteners, contact adhesives, or sonic welding. In certain inventive embodiments, parts 54 and 54' vary in the relative amount of carbon fiber relative to primary fiber. In other inventive embodiments, the primary fiber is glass. In still other embodiments the outer part (54 or 54') has a higher percentage of glass fiber relative to carbon fiber compared to the inner part (the other of 54 or 54') and the outer part has, or is capable of being finished to a gloss for a new vehicle body.

The incorporation of the glass microspheres into part 54 that cross-link to the resin matrix are present in certain inventive embodiments to reduce density and improve the strength of the resultant article. Such microspheres are in US 2006/0258781; and U.S. provisional application 62/018,377.

Through injection and stamping processes as illustrated above, additional material may be added in order to obtain desired properties and functions in the final product.

The foregoing description is illustrative of particular embodiments of the invention, but is not meant to be a limitation upon the practice thereof. References cited herein are hereby incorporated by reference to same extent as if each reference is explicitly and specifically incorporated by reference.

The invention claimed is:

1. A dual layer cured composite article comprising:
an outer part having an outer part thickness and composed of a first resin matrix having between 50 and 70 total weight percent of said outer part being an outer part mixed fiber filler from an outer part mixed fiber source, said outer part mixed fiber filler having an outer part primary fiber: carbon fiber ratio of 0.05-20:1, said outer part primary fiber and carbon fiber being homogenously distributed throughout said outer part;
an inner part complementary to said outer part and having an inner part thickness and composed of a second resin matrix having between 40 and 60 total weight percent of said inner part being an inner mixed fiber filler from an inner part mixed fiber source, said inner mixed fiber filler having an inner part primary fiber: carbon fiber ratio of less than said outer part primary fiber: carbon fiber ratio, said inner part primary fiber and carbon fiber being homogenously distributed throughout said inner part; and a joinder between said outer part and said inner part.

2. The article of claim 1 wherein said outer primary fiber is glass.

3. The article of claim 1 wherein said outer part mixed fiber filler are chopped fibers from a combined tow of primary fiber and carbon fiber.

4. The article of claim 3 further comprising a thermoplastic overmolding defining a preform.

5. The article of claim 1 wherein said inner part mixed fiber filler are chopped fibers.

6. The article of claim 1 wherein said outer part primary fiber:carbon fiber ratio is 0.6-1.3:1.

7. The article of claim 1 wherein said outer part thickness is 0.9 to 3.5 mm.

8. The article of claim 1 wherein said outer part has a density of 1.1 to 1.3.

9. The article of claim 1 wherein said inner part thickness is 0.9 to 2.4 mm.

10. The article of claim 1 wherein said inner part has a density of 1.1 to 1.6.

11. The article of claim 1 wherein said outer part mixed fiber filler are a woven or nonwoven fabric of combined primary fiber and carbon fiber.

12. The article of claim 1 wherein said outer part is adapted to receive an automotive body panel surface gloss.

13. The article of claim 1 wherein said joinder is a contact adhesive.

14. The article of claim 1 having a shape of a vehicle deck lid, a vehicle door, a vehicle roof, a vehicle fender, or a vehicle floor.

15. The article of claim 1 wherein carbon fiber in said inner part is recycled.

* * * * *